US008265841B2

(12) United States Patent
Kamada

(10) Patent No.: US 8,265,841 B2
(45) Date of Patent: Sep. 11, 2012

(54) SHIFT CONTROL DEVICE

(75) Inventor: Atsushi Kamada, Nishikamo-gun (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 225 days.

(21) Appl. No.: 12/670,089

(22) PCT Filed: Jun. 12, 2008

(86) PCT No.: PCT/JP2008/060801
§ 371 (c)(1),
(2), (4) Date: Jan. 21, 2010

(87) PCT Pub. No.: WO2009/013949
PCT Pub. Date: Jan. 29, 2009

(65) Prior Publication Data
US 2010/0145583 A1    Jun. 10, 2010

(30) Foreign Application Priority Data

Jul. 23, 2007 (JP) .................................. 2007-190670

(51) Int. Cl.
*G06F 7/00* (2006.01)
*G06F 17/00* (2006.01)
*G06F 19/00* (2006.01)

(52) U.S. Cl. ........................................................ 701/62
(58) Field of Classification Search ........................ 701/62
See application file for complete search history.

(56) References Cited

U.S. PATENT DOCUMENTS 7,572,203 B2 *   8/2009   Kashiwagi et al. ............. 477/34

(Continued)

FOREIGN PATENT DOCUMENTS

DE    10027331 A1    12/2000

(Continued)

OTHER PUBLICATIONS

Japanese Office Action dated Mar. 29, 2011 issued in a corresponding Japanese Patent Application No. 2007-190670.

(Continued)

*Primary Examiner* — Mary Cheung
*Assistant Examiner* — Michael D Lang
(74) *Attorney, Agent, or Firm* — Sughrue Mion, PLLC

(57) ABSTRACT

In a shift control device operative to determine shift positions based on an absolute positional information related to a mechanical displacement of a shift mechanism, it is intended that the shift positions are accurately determined regardless of disturbance and deterioration with time. It is determined as to whether a varying width of a position voltage PV representing absolute positional information relative to a varying width of a pulse count number CP representing relative positional information is larger than an varying allowable range. When a state, under which difference between the both variations is larger than the varying allowable range, continues beyond a determining time T, a determination is made that persistent disturbance is existed in the position voltage PV, and a correlation between the position voltage PV and the shift positions "P", "R", "N" and "D" is learnt and corrected. This allows the correlation to be corrected even if a variation occurs in the position voltage PV due to for instance variations in a disturbance magnetic field or an environmental temperature, a change with time of an output characteristic of a hall element 78, so that the shift position can be determined based on the position voltage PV with increased precision at all times.

5 Claims, 9 Drawing Sheets

U.S. PATENT DOCUMENTS

| | | | |
|---|---|---|---|
| 2002/0026271 A1* | 2/2002 | Ebashi | 701/62 |
| 2004/0162661 A1* | 8/2004 | Kikuchi | 701/62 |
| 2008/0028879 A1* | 2/2008 | Robinette et al. | 74/335 |
| 2008/0115613 A1* | 5/2008 | Giefer et al. | 74/473.21 |
| 2009/0000407 A1* | 1/2009 | Meyer et al. | 74/10.1 |

FOREIGN PATENT DOCUMENTS

| | | |
|---|---|---|
| DE | 102004017257 A1 | 12/2004 |
| JP | 2002-310294 A | 10/2002 |
| JP | 2002-323127 A | 11/2002 |
| JP | 2002-349702 A | 12/2002 |
| JP | 2003-139231 A | 5/2003 |
| JP | 2003-166641 A | 6/2003 |
| JP | 3800529 B2 | 1/2004 |
| JP | 2004-108382 A | 4/2004 |
| JP | 2004-308847 A | 11/2004 |
| JP | 2005-003132 A | 1/2005 |
| JP | 2007-170523 A | 7/2007 |

OTHER PUBLICATIONS

International Preliminary Report on Patentability issued Apr. 8, 2010 in corresponding Application PCT/JP2008/060801.

German Office Action issued in Application No. 112008001942.8 dated May 18, 2012.

* cited by examiner

| | C1 | C2 | B1 | B2 | B3 |
|---|---|---|---|---|---|
| 1st | ○ | | | ○ | |
| 2nd | ○ | | ○ | | |
| 3rd | ○ | | | | ○ |
| 4th | ○ | ○ | | | |
| 5th | | ○ | | | ○ |
| 6th | | ○ | ○ | | |
| Rev | | | | ○ | ○ |

SHIFT CONTROL DEVICE

CROSS REFERENCE TO RELATED APPLICATION

This application is a National Stage of International Application No. PCT/JP2008/060801 filed Jun. 12, 2008, claiming priority based on Japanese Patent Application No. 2007-190670, filed Jul. 23, 2007, the contents of all of which are incorporated herein by reference in their entirety.

TECHNICAL FIELD

The present invention relates to a shift control device, and more particularly, to improvement in the shift control device for determining shift positions in response to an absolute positional information on a mechanical displacement of a shift mechanism.

BACKGROUND ART

There has heretofore been known a so-called shift-by-wire type shift control device including (a) shift-intention detecting means for electrically detecting a driver's shift-intention; (b) a shift mechanism, moveable by shift drive means that is electrically controlled in response to the driver's shift-intention, to be displaced to a plurality of shift positions; (c) positional information detecting means for detecting positional information on the mechanical displacement of the shift mechanism; and (d) shift position determining means for determining the shift positions based on resulting positional information. One example of a vehicular shift control device is disclosed in Patent Publication 1. With such a structure, restricting means is provided for mechanically restricting a movable end (such as, for instance, a parking position) of the shift drive means. Leaning the movable end as a reference position allows the shift positions to be determined based on relative positional information (such as a pulse number, etc., of an encoder), even on detecting relative positional information with the use of the positional information detecting means. Further, Patent Publication 2 proposes a technology of detecting an absolute positional information of mechanical displacement of a shift mechanism in a noncontact manner by a hall element etc., so that the shift positions are determined based on the absolute positional information in accordance with a correlation preliminarily determined in terms of the absolute positional information (such an output voltage, etc., of a hall element) and the plurality of shift positions.

[Patent Publication 1] Japanese Patent Application Publication No. 2004-308847

[Patent Publication 2] Japanese Patent Application Publication No. 2004-108382

The structure in the former Publication is arranged to allow a parking position (P range) to be learnt as an abutting engagement position, and the abutting engagement positions are different depending on whether or not a parking lock is effectuated. This causes an issue in which no high precision is necessarily obtained on determining the shift positions. In contrast, with the structure of latter Publication, the shift positions determined in response to absolute positional information can be accurately determined regardless of the presence or absence of the parking lock. However, absolute positional information, such as the output voltage of the hall element, is varied in response to for instance variations in a disturbance magnetic field or an environmental temperature, deterioration with time or the like, making accurate determining of the shift positions difficult. An attempt to control the shift mechanism based on for instance the resulting shift positions may deviate the shift positions from correct positions.

SUMMARY OF THE INVENTION

The present invention has been completed with the above view in mind and has an object to provide a shift control device in which shift positions are determined based on absolute positional information on a mechanical displacement of a shift mechanism, and the shift positions can be accurately determined at all times regardless of disturbance, deterioration with time or the like.

For achieving the above object, a first aspect of the present invention provides a shift control device which includes (a) shift-intention detecting means for electrically detecting a driver's shift-intention, (b) a shift mechanism to be mechanically displaced to a plurality of shift positions by shift drive means electrically controlled based on the driver's shift-intention, (c) noncontact type first positional information detecting means for detecting an absolute positional information of a mechanical displacement of the shift mechanism, and (d) shift position determining means for determining the shift position in accordance with a correlation preliminarily determined in terms of the absolute positional information and the plurality of shift positions based on the absolute positional information. The shift control device comprises (e) error determining means for determining a persistent error existed in the absolute positional information, and (f) correcting means for correcting either one of the correlation preliminarily determined in terms of the absolute positional information and the plurality of shift positions, and the absolute positional information, when existence of the persistent error in the absolute positional information is determined.

A second aspect of the present invention is featured by, in the first aspect, that the shift control device further comprises second positional information detecting means for detecting a relative positional information of the mechanical displacement of the shift mechanism, and the error determining means compares a variation in the absolute positional information and a variation in the relative positional information for determination.

A third aspect of the present invention is featured by, in the second aspect, that the error determining means determines existence of the persistent error, when a state, under which a varying width of the absolute positional information relative to a varying width of the relative positional information is larger than a certain reference, continues beyond a certain time period.

A fourth aspect of the present invention is featured by, in the second or third aspect, that both of the absolute positional information and the relative positional information are represented by rotary angles, the first positional information detecting means is a noncontact rotary angle sensor operative to detect a magnetic field varying depending on the rotary angle, and the second positional information detecting means is a rotary encoder operative to output pulses depending on the rotary angle.

According to the shift control device of the first aspect, the shift control device comprises error determining means for determining a persistent error existed in the absolute positional information, and correcting means for correcting either one of the correlation preliminarily determined in terms of the absolute positional information and the plurality of shift positions, and the absolute positional information, when existence of the persistent error in the absolute positional information is determined. Therefore, even if a persistent error is existed in the absolute positional information due to for instance variations in a disturbance magnetic field or a variation in environmental temperature, deterioration with time or the like, the shift positions can be determined with increased precision at all times based on the absolute positional information.

With a second aspect of the present invention, the second positional information detecting means is provided for detecting the relative positional information of the mechanical displacement of the shift mechanism, to compare a variation in the absolute positional information and a variation in the relative positional information for determination. This can determine as to whether the persistent error is existed in the absolute positional information with increased precision. Especially with a third aspect of the present invention, when a state, in which a varying width of the absolute positional information relative to a varying width of the relative positional information is larger than a certain reference, continues beyond a certain time period, the error determining means determines existence of the persistent error. Thus, as to whether the persistent error is existed or not can be determined with further increased precision.

In a fourth aspect of the present invention, the first positional information detecting means is a noncontact rotary angle sensor for detecting a magnetic field varying depending on the rotary angle, and the noncontact second positional information detecting means is a rotary encoder operative to output pulses depending on the rotary angle, to which the second and third aspects of the present invention may be preferably applied.

While the shift control device of the present invention may be preferably applied to a vehicular shift control device operative to switch a driving state of a vehicle depending on a driver's shift-intention, it may also be preferably applied to a shift control device of another apparatus other than the vehicle. If applied to the vehicular shift control device, a shift mechanism may include for instance (a) a drive switching valve having a plurality of oil flow-passage switching positions as a plurality of shift positions including an interrupting position (for positions "N" or "P", etc.) in which a power transmitting is interrupted, a forward drive position (a position "D") for a forward drive and a reverse drive position (a position "R") for a reverse drive, and (b) a changeover shaft drivably rotatable about the center axis by shift drive means to linearly reciprocate a valve body (spool) of the drive switching valve for moving it to the plurality of oil flow-passage switching positions, (c) whereby at a forward drive position a forward drive hydraulic pressure is output, whereas at a reverse drive position a rearward drive hydraulic pressure is output. The shift mechanism may be implemented in various modes. That is, the shift mechanism may suffice to merely have two oil flow-passage switching positions including a drive position for performing the forward drive and the reverse drive, and an interrupting position. In another alternative, the valve body may be rotated about the center axis to switch the oil-flow passages.

Further, the shift-intention detecting means may be of the type in which the driver's shift-intention is converted to an electrical signal. The shift-intention detecting means may include, for instance, a lever position sensor and a pushbutton type switch arranged to detect an operated position of a shift lever, and a momentary type detection device arranged to detect and store an operated position of an operation lever operative to automatically restore to an original position such as a neutral position or the like.

Further, the first positional information detecting means may preferably be comprised of a noncontact type rotary angle sensor having a hall element and a magnetic reluctance element or the like arranged to detect a magnetic field varying depending on for instance the rotary angle. However, the first positional information detecting means may have various modes such as a gap sensor or the like arranged to detect a plurality of shift positions of a member linearly moved in a manner as described in Patent Publication 1, in a noncontact fashion. The second positional information detecting means may preferably include for instance a rotary encoder operative to output pulses depending on the rotary angle. However, the second positional information detecting means may have various modes regardless of a contact type or a noncontact type such as a magnet scale arranged to output pulses depending on a displacement stroke of a member being caused to linearly move. The first positional information detecting means may detect a plurality of shift positions of the member linearly moved, and the second positional information detecting means may output pulses depending on the rotary angle. There is no need for detection objects to be necessarily identical to one another.

With the second aspect of the present invention, moreover, the second positional information detecting means, for detecting the relative positional information of the mechanical displacement of the shift mechanism, is provided to compare the variation in absolute positional information and the variation in relative positional information for determination. However, on carrying out the first aspect of the present invention, various modes may be employed in which for example the second positional information detecting means of the contact type or the noncontact type is provided for detecting absolute positional information, on a principle different from that of the first positional information detecting means to compare two absolute positional informations with each other for determination.

As used herein, the term "persistent error" refers not only to an error resulting from disturbance caused by a magnetic field or an environmental temperature or the like adversely affecting detecting precision of the first positional information detecting means, but also to an error caused by a change with time in detecting characteristic of detecting means per se. The error determining means preferably determines as to whether the persistent error resulting from such disturbance and change with time is existed. However, when the error determining means can discriminate or determine one error caused by disturbance, and the other error resulting from the change with time, it may be of the type that can determine the presence of either one of such errors being existed.

Further, the correcting means may not only have a structure to correct the correlation preliminarily determined in terms of the absolute positional information and the plurality of shift positions, but also have a structure to correct the absolute positional information per se. These structures can render the substantially same advantageous effects.

The present invention may be preferably applied to a variety of shift control devices for vehicles such as an engine-propelled vehicle operative to generate a drive power by combustion of fuel, an electric vehicle propelled by an electric motor to run or a hybrid vehicle equipped with plural drive power sources, etc. In addition, the present invention may have applications to various other vehicles of the types, including a forward drive and rearward drive switching device arranged to switch a forward drive and a rearward drive, a step-variable automatic transmission having a plurality of gear positions with different gear ratios or a continuously variable transmission arranged to continuously vary speed ratios, in each of which drive states are altered by a shift mechanism.

EXPLANATION OF REFERENCES

Figures 1, 2:
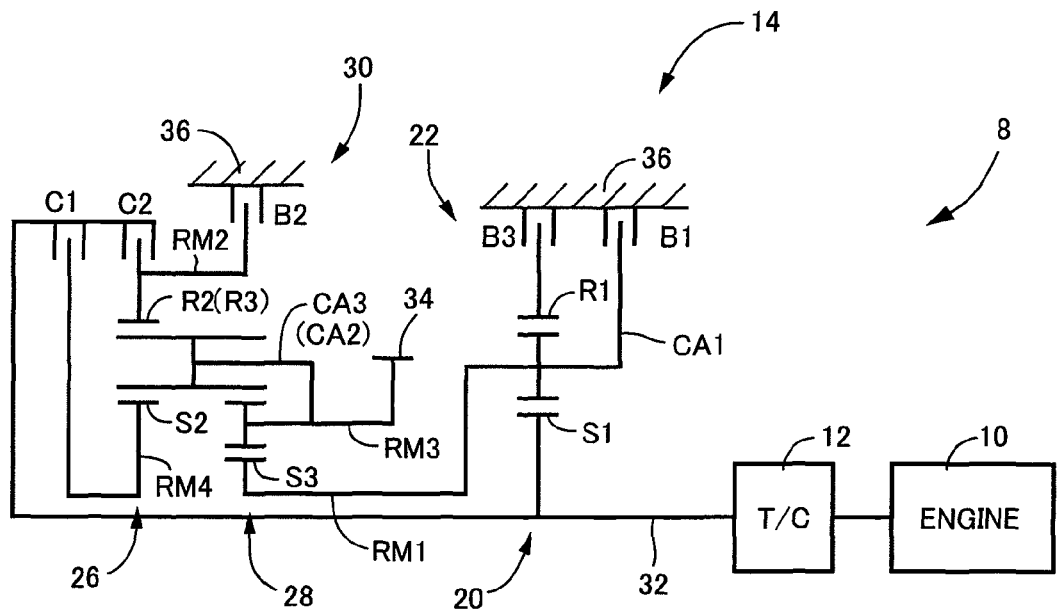
FIG. 1 is a skeleton view of a vehicular drive apparatus to which the present invention is preferably applied.
FIG. 2 is a view showing an operation table illustrating the relationship between a plurality of gear positions of an automatic transmission shown in FIG. 1, and engagement and disengagement states of a frictional engaging device.

8: drive apparatus
46: manual valve
50: shift operation device
60: shift operation detecting device (shift-intention detecting means)
62: electronic control unit
64: SBW actuator (shift drive means)
70: shift mechanism
72: rotary encoder (second positional information detecting means)
74: noncontact position sensor (first positional information detecting means)
80: shift control means
84: shift-position determining means
90: disturbance determining means
92: correcting means
PSH: shift operated position (shift-intention)
PV: position voltage (absolute positional information)
SP: pulse signal (relative positional information)
T: determining time (certain time period)

BEST MODE FOR CARRYING OUT THE INVENTION

Now, an embodiment according to the present invention will be described below in detail with reference to the accompanying drawings. [Embodiment]

FIG. 1 is a skeleton view of a drive apparatus 8 for a transverse-mounted vehicle such as FF (Front engine and Front drive) vehicle or the like. An engine 10 comprised of an internal combustion engine such as a gasoline engine and a diesel engine, etc. provides an output, which is delivered through a torque converter 12 and an automatic transmission 14 to a differential gear unit, not shown, for delivery to drive wheels (front wheels). The engine 10 serves as a drive power source (prime mover) for running a vehicle, and the torque converter 12 is a fluid coupling.

The automatic transmission 14 includes a first shifting portion 22 mainly comprised of a first planetary gear set 20 of a single pinion type, and a second shifting portion 30 mainly comprised of a second planetary gear set 26 of a single pinion type and a third planetary gear set 28 of a double pinion type. These shifting portions are disposed coaxially and output the rotation of an input shaft 32 of an output gear 34 at a shifted ratio. The input shaft 32 corresponding to an input member is a turbine shaft of the torque converter 12 in the present embodiment. The output gear 34 corresponding to an output member drivably rotates the left and right drive wheels via the differential gear unit. In addition, the automatic transmission 14 has a substantially symmetric structure with respect to a centerline with a lower half of the centerline being omitted from FIG. 1.

The first planetary gear set 20 forming the first shifting portion 22, has three rotary elements including a sun gear S1, a carrier CA1 and a ring gear R1. The sun gear S1 is connected to the input shaft 32 to be rotatably driven. The ring gear R1 is fixedly secured to a case 36 via a third brake B3 for non-rotating capability, which causes the carrier CA1 to rotate as an intermediate output member at a reduced speed lower than that of the input shaft 32 to provide an output. Further, the second and third planetary gear sets 26 and 28 forming the second shifting portion 30 are partially connected to each other thereby forming four rotary elements RM1 to RM4. More particularly, the sun gear S3 of the third planetary gear set 28 forms the first rotary element RM1. The ring gears R2 and R3 of the second and third planetary gear sets 26 and 28 are connected to each other to form the second rotary element RM2. The carriers CA2 and CA3 of the second and third planetary gear sets 26 and 28 are connected to each other to form the third rotary element RM3. The sun gear S2 of the second planetary gear set 26 forms the fourth rotary element RM4. The second and third planetary gear sets 26 and 28 are structured in a Ravignaux type planetary gear train, in which the carriers CA2 and CA3 are structured of common members, the ring gear R2 and R3 are structured of common members, and the pinion gear of the second planetary gear set 26 is commonly used as second pinion gear of the third planetary gear set 28.

The first rotary member RM1 (sun gear S3) is selectively connected to the case 36 via the first brake B1 to be halted in rotation. The second rotary member RM2 (ring gears R2 and R3) is selectively connected to the input shaft 32 via the second brake B2 to be halted in rotation. The fourth rotary member RM4 (sun gear S2) is selectively connected to the input shaft 32 via the first clutch C1. The second rotary member RM2 (ring gears R2 and R3) is selectively connected to the case 36 via the second clutch C2. The first rotary member RM1 (sun gear S3) is unitarily connected to the carrier CA1 of the first planetary gear set 20 acting as the intermediate output member, and the third rotary member RM3 (carriers CA2 and CA3) is unitarily connected to the output gear 34 to output the rotation.

Figure 3:
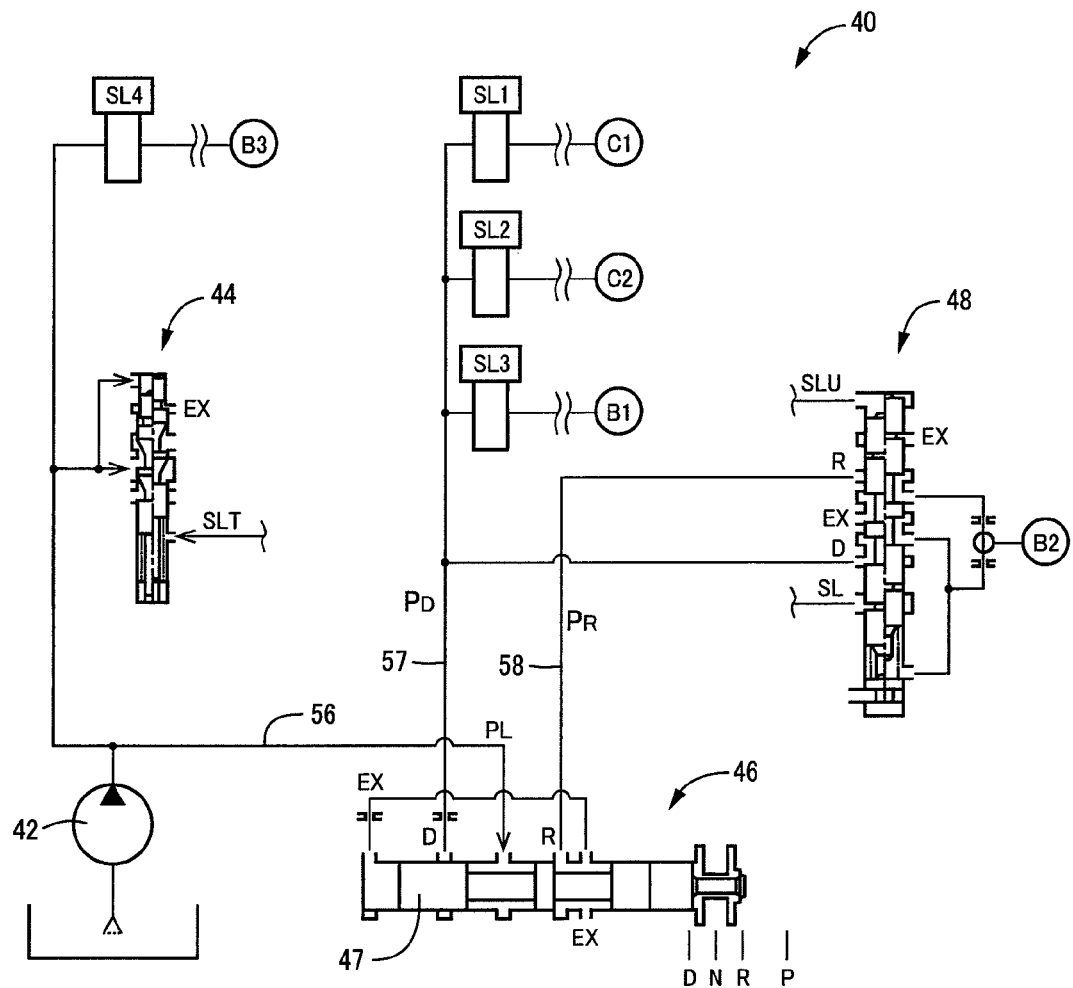
FIG. 3 is a circuit diagram showing, of a hydraulic control circuit incorporated in the vehicular drive apparatus shown in FIG. 1, correlated parts of a manual valve, clutches C1 and C2 and brakes B1 to B3.

The clutches C1 and C2 and the brakes B1 to B3 (hereinafter merely referred to as "clutches C" and "brakes B" unless otherwise specified) are hydraulic friction engaging devices that are controlled in engagement with hydraulic actuators such as multi-disc type clutches or brakes. A hydraulic control circuit 40 shown in FIG. 3 is arranged to controllably engage or disengage the clutches C and the brakes B to establish a gear position in one of forward-drive six gear positions and a reverse-drive gear position. This is accomplished in a manner as shown in FIG. 2 depending on a shift operated position PSH of a shift operation device 50 (see FIG. 4). Symbols "1st" to "6th" shown in FIG. 2 represent a 1st-speed gear position to a 6th-speed gear position, and a symbol "Rev" represents a reverse-drive gear position. These gear positions provide speed ratios (=input-shaft rotation speed NIN/output-shaft rotation speed NOUT) that are suitably determined in accordance with respective gear ratios $\tau1$, $\tau2$ and $\tau3$ of the first, second and third planetary gear sets 20, 26 and 28. In FIG. 2, a symbol "o" in FIG. 2 represents an engaged state and a blank represents a disengaged state.

In FIG. 3, the hydraulic control circuit 40 includes a mechanical oil pump 42 rotatably driven with the engine 10, a primary regulator valve 44, a manual valve 46, linear solenoid valves SL1 to SL4 and a B2-control valve 48, etc. Hydraulic oil drawn up by the oil pump 42 is regulated by the primary regulator valve 44 in response to a signal pressure supplied from a linear solenoid valve SLT (not shown) to a certain line pressure PL depending on an accelerator displacement stroke (indicative of an output demand of a driver). The brake B3 is controlled in an engagement hydraulic pressure thereof by the linear solenoid valve SL4 supplied with the line pressure PL as it is to be engaged or disengaged.

Figure 4:
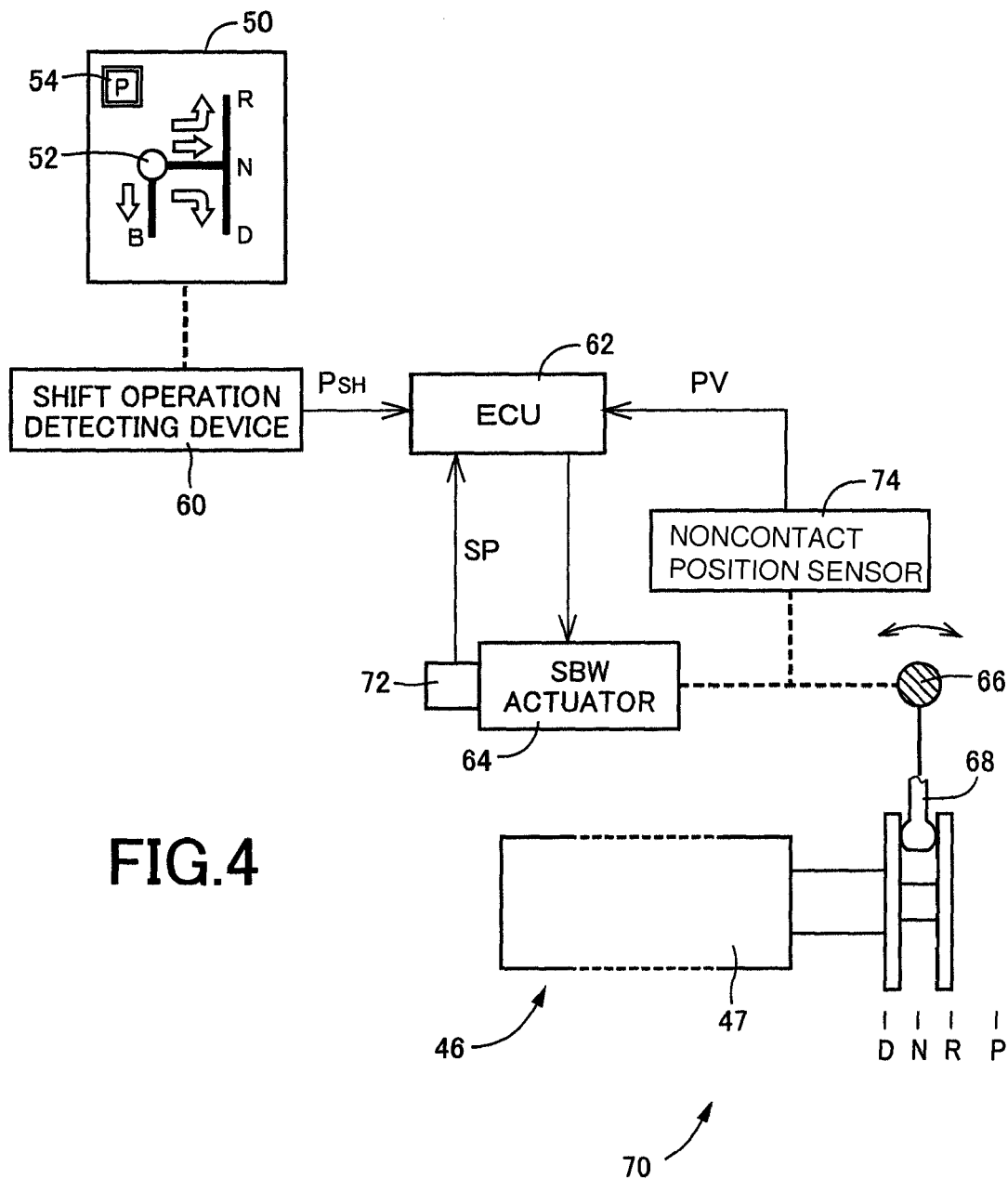
FIG. 4 is a block diagram illustrating a control system of the vehicular drive apparatus shown in FIG. 1 for electrically switching shift positions of the manual valve in accordance with a shift operation device.

The manual valve 46 is arranged to switch oil-flow passages of the shift operation device 50 depending on the operation thereof. This causes a forward-drive hydraulic pressure PD to be supplied to the linear solenoid valves SL1 to SL3, provided in correspondence to the clutches C1 and C2 and the first brake B1, and the B2-control valve 48, and a reverse-drive hydraulic pressure PR to be supplied to the B2-control valve 48, with hydraulic pressures to be supplied to these valves being selectively interrupted. The shift operation device 50 is operable in response to a shift-intention commanded by a driver and as shown in FIG. 4 includes a shift lever 52, and a push-button type P-switch 54 depressed in parking.

The shift lever 52 is operatively moveable to four shift positions of "R (Reverse)" for reverse-drive running, "N (Neutral)" in which a power transmitting is interrupted, "D (Drive)" for forward-drive running, and "B (Brake)" for obtaining an engine braking. The shift lever 52 is of a momentary type, to be automatically restored to its neutral position shown in the drawing at all times, which includes a shift operation detecting device 60 arranged to detect the shift lever 52 being operated to one of the various shift positions "R", "N", "D" and "B". Thus, such shift operated positions PSH of the P-switch 54 including an ON-operation (operated position "P"), inclusive of i.e., driver's shift-intention, can be electrically detected. Depending on the shift operated positions PSH, an electronic control unit (ECU) 62 controls an SBW (shift-by-wire) actuator 64. This rotates a changeover shaft 66 about the center axis such that a spool (valve body) 47 of the manual valve 46 is mechanically moved in a linear direction via a lever 68. Thus, the spool 47 can be positioned to one of the four shift positions "P", "R", "N" and "D" to switch the oil-flow passages. With the shift operated position PSH placed in "B", the forward-drive running with "D" is premised. With the manual valve 46 remaining in the shift position "D" a shift control is electrically executed to increase the engine braking.

In the shift position "D" of the manual valve 46 representing a forward-drive position for the forward-drive running, as will be apparent from FIG. 3, the manual valve 46 takes a state to allow a supply oil passage 56 applied with the line pressure PL to communicate with a forward-drive oil passage 57. Thus, a forward-drive oil pressure PD is output to the forward-drive oil passage 57 at a level equal to the line pressure PL. The forward-drive oil passage 57 is connected to the linear solenoid valves SL1 to SL4 and the B2-control valve 48. With controllably regulating the forward-drive oil pressure PD by these values, the clutches C1 and C2 and the brakes B1 and B2 are controllably engaged or disengaged in combination with engagement and disengagement controls of the third brake B3. This establishes a forward-drive gear position placed in one of the 1st-speed gear position "1st" to the 6th-speed gear position "6th". The B2-control valve 48 is supplied with signal pressures from solenoid valves (SLU and SL) not shown to control an engagement oil pressure of the second brake B2 based on the signal pressure delivered from the solenoid valve SLU.

In the shift position "R" of the manual valve 46 representing a rearward-drive position for the rearward-drive running, the manual valve 46 takes a state to communicate the supply oil passage 56 applied with the line pressure PL with a rearward-drive oil passage 58 so that a rearward-drive oil pressure PR equal to the line pressure PL is output to the rearward-drive oil passage 58. The rearward-drive oil passage 58 is connected to the B2-control valve 48 to supply the rearward-drive oil pressure PR to the second brake B2, which causes the second brake B2 to engage. With engaging the third brake B3 in this state, a rearward-drive gear position "Rev" is established.

The shift positions "P" of the manual valve 46 represents a parking position under which a power transmitting from a drive-force source is interrupted and a parking lock device (not shown) mechanically blocks the drive wheels from rotating. In the shift position "P", the manual valve 46 interrupts the supply oil passage 56 applied with the line pressure PL from communicating with any one of the forward-drive oil passage 57 and the rearward-drive oil passage 58 and communicates the forward-drive oil passage 57 and the rearward-drive oil passage 58 with an EX-port for draining hydraulic oil. The shift position "N" represents an interrupting position under which the power transmitting from the drive-force source is interrupted. In the shift position "N", the manual valve 46 interrupts the supply oil passage 56 applied with the line pressure PL from communicating with any one of the forward-drive oil passage 57 and the rearward-drive oil passage 58, and communicates the forward-drive oil passage 57 and the rearward-drive oil passage 58 with the EX-port for draining hydraulic oil. In FIG. 3, the manual valve 46 is placed in such a shift position "N". The manual valve 46 corresponds to a drive switching valve and the spool 47 corresponds to a valve body.

In the illustrated embodiment, a shift mechanism 70 for switching a drive state of a vehicle is structured including the manual valve 46 and the changeover shaft 66, and the SBW actuator 64 corresponds to shift drive means. The SBW actuator 64 in this embodiment is comprised of an SR motor (Switched Reluctance Motor), which is connected to the changeover shaft 66 via a gear reduction unit or the like to drivably rotate the changeover shaft 66. The SBW actuator 64 unitarily incorporates therein a rotary encoder 72 that outputs a pulse signal SP for supply to the electronic control unit 62. The rotary encoder 72 is an optical noncontact rotation sensor, having a pair of a light emitting element and a light receiving element, which is arranged to output the pulse signal SP for each rotation of the SBW actuator 64. The rotary encoder 72 also functions as second positional information detecting means that detects a mechanical displacement of the shift mechanism 70, i.e., relative positional information of a rotational displacement of the changeover shaft 66 in the present embodiment. The pulse signal SP corresponds to relative positional information.

Figure 5:
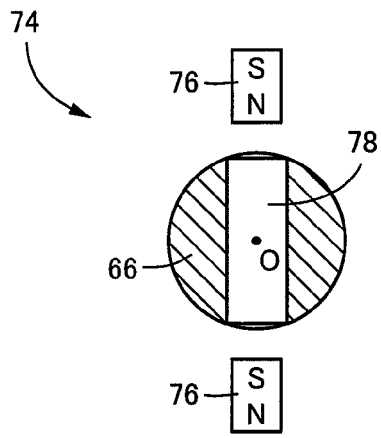
FIG. 5 is a schematic structural view illustrating a noncontact position sensor shown in FIG. 4.

Further, a noncontact position sensor 74 is disposed on the changeover shaft 66. The noncontact position sensor 74 is a noncontact type rotational-angle sensor operative to detect the mechanical displacement of the shift mechanism 70, i.e., absolute positional information of the rotational displacement of the changeover shaft 66, which functions as first positional information detecting means. As shown in FIG. 5, the noncontact position sensor 74 includes a pair of magnets 76 mounted in areas near an outer circumference of the changeover shaft 66 in symmetric positions with respect to the center axis "O", and a hall element 78 integrally mounted on the changeover shaft 66 to be unitarily rotatable about the center axis "O". The hall element 78 is arranged to output a position voltage PV that varies depending on the magnitudes of magnetic fields. With rotation of the changeover shaft 66, the magnitudes of the magnetic fields acting on the hall element 78 vary such that the position voltage PV continuously varies depending on a rotational angle of the changeover shaft 66. Accordingly, the rotational angle of the changeover shaft 66 and, in addition, the shift positions "P", "R", "N" and "D" can be detected depending on the position voltage PV. The position voltage PV corresponds to absolute positional information.

Figure 6:
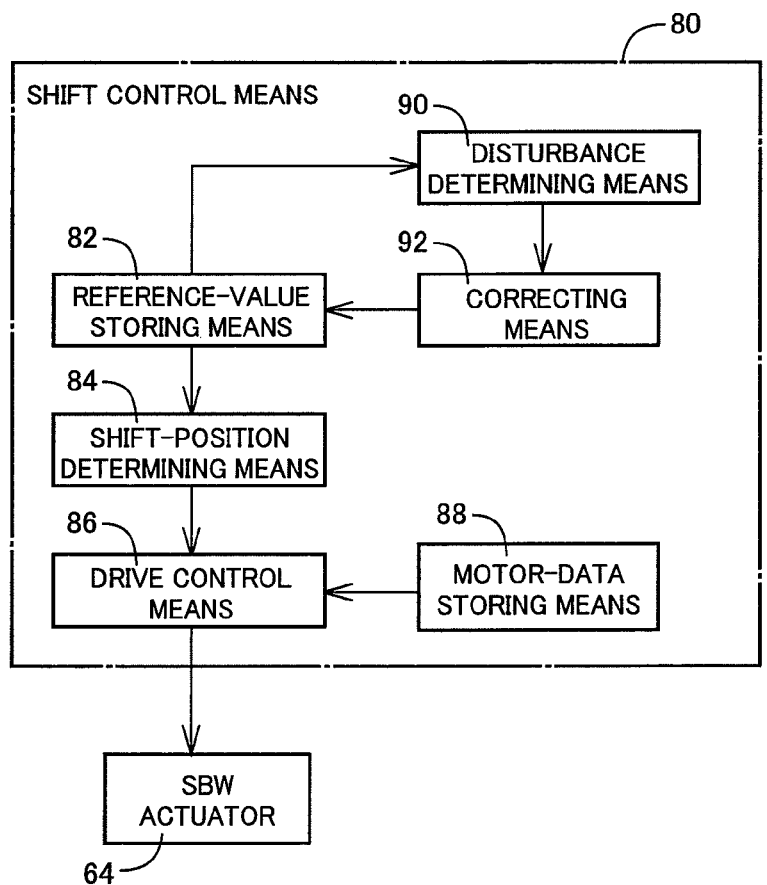
FIG. 6 is a block diagram of an electronic control unit shown in FIG. 4 for illustrating a function related to a shift control.

The electronic control unit 62 is comprised of a microcomputer having a CPU, a RAM and a ROM, etc., to execute signal processing in accordance with preliminarily stored programs for thereby performing various functions. FIG. 6 shows a block diagram illustrating a function of shift control means 80 to be executed by the electronic control unit 62 when the SBW actuator 64 is controlled to switch the manual valve 46 depending on the shift operation SH of the shift operation device 50. The shift control means 80 includes reference-value storing means 82, shift-position determining means 84, drive control means 86 and motor-data storing means 88.

Figure 7:
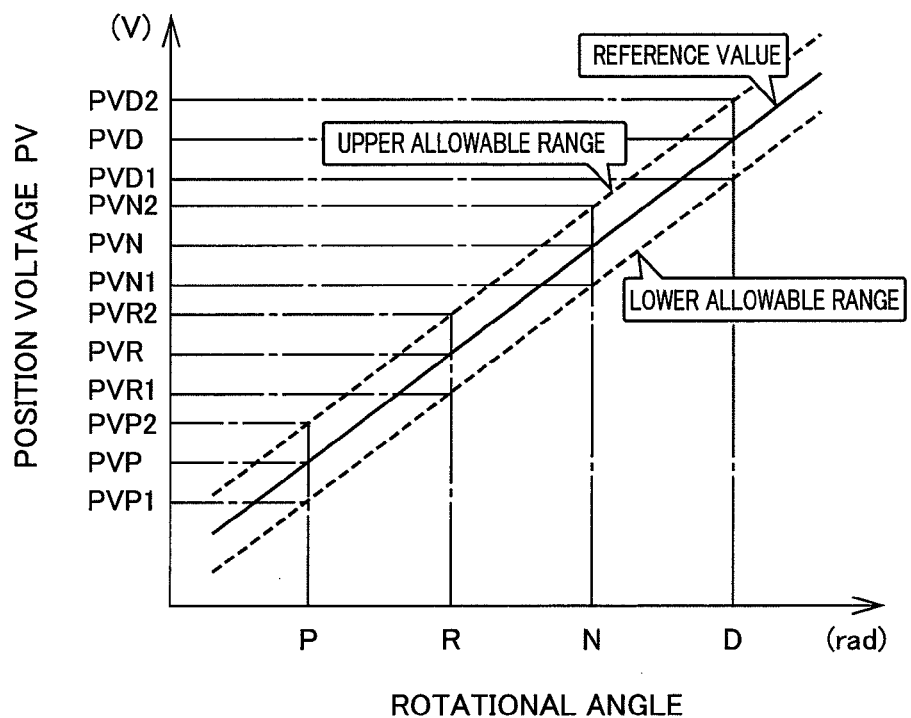
FIG. 7 is a view illustrating the correlation between a position voltage PV stored in reference value storing means shown in FIG. 6, and the shift positions.

The reference-value storing means 82 serves to store the correlation, between the position voltage PV output from the noncontact position sensor 74, and the shift positions "P", "R", "N" and "D", i.e. the rotational angle of the changeover shaft 66 about the center axis "O", which is acquired in advance before shipment at a factory. A solid line in FIG. 7 represents one example of the reference value of such a correlation, and the noncontact position sensor 74 is structured such that the position voltage PV varies in a substantially linear fashion with respect to the rotational angle of the changeover shaft 66. Moreover, the position voltage PV is varied by temporary disturbance including a variation (an individual difference) on detecting precision, and temperature change etc. of the noncontact position sensor 74. In view of such a variation in position voltage PV, certain upper and lower allowable ranges are preset at upper and lower levels, i.e., sides of the reference value, respectively. Although the upper and lower allowable ranges are set to levels spaced from the reference value in upper and lower areas for instance by certain equal values with respect to the reference value, these ranges may be determined to be spaced at separate values. There is no need to provide a graph as shown in FIG. 7, and an allowable range of the position voltage PV and a reference value may be set as a correlation for each of the shift positions "P", "R", and "D".

The shift position determining means 84, based on the upper and lower allowable ranges stored in the reference-value storing means 82, determines one of the shift positions "P", "R", "N" and "D" to which a current shift position belongs. That is, if the position voltage PV lies in a value between PVP1 and PVP2, then, "P" is determined as the shift position of the manual valve 46. If the position voltage PV lies in a value between PVR1 and PVR2, then, a "R" is determined as the shift position of the manual valve 46. If the position voltage PV lies in a value ranging from PVN1 and PVN2, then, "N" is determined as the shift position of the manual valve 46. If the position voltage PV lies in a value between PVD1 and PVD2, then, a "D" is determined as the shift position of the manual valve 46.

Figure 8:
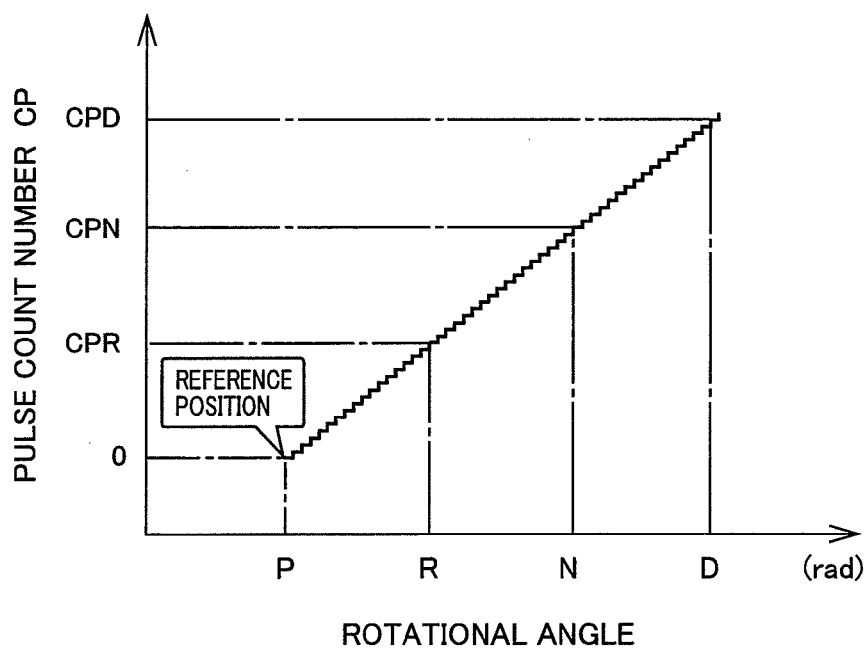
FIG. 8 is a view illustrating the correlation between a pulse count number CP stored in motor data storing means shown in FIG. 6, and the shift positions.

The drive control means 86 compares the shift position of the manual valve 46 determined by the shift position determining means 84, and the shift operated position PSH detected by the shift operation detecting device 60, to control the SBW actuator 64 based on motor data stored in the motor-data storing means 88 such that the shift position of the manual valve 46 matches the shift operated position PSH. The motor data stored in the motor-data storing means 88 has a correlation preliminarily acquired before shipment at the factory in terms of a count number CP of the pulse signal SP output from the rotary encoder 72, and the four shift positions "P", "R", "N" and "D" of the manual valve 46, i.e., the rotational angle of the changeover shaft 66 about the center axis "O" thereof. That is, such a correlation is acquired with assigning the position "P" of the manual valve 46 representing the shift position placed when for instance the ignition switch is turned on to a reference position. FIG. 8 shows one example of such a correlation.

Accordingly, the pulse count number CP, starting from the current shift position up to the shift position corresponding to the shift operated position PSH, may suffice to be acquired. The SBW actuator 64 is drivably rotated in normal or reverse direction such that the pulse signal SP is supplied by the pulse count number CP. For instance, with the current shift position remained at "P", when the shift operated position PSH is changed from "P" to "D", the SBW actuator 64 may suffice to be drivably rotated such that the pulse signal SP is supplied by a pulse count number CPD. In contrast, with the current shift position remained at "D", when the shift operated position PSH is changed from "D" to "N" or "R", the SBW actuator 64 may suffice to be drivably rotated in the reverse direction such that the pulse signal SP is supplied by a pulse count number equal to (CPD−CPN) or (CPD−CPR). Motor data is determined on an assumption that the manual valve 46 is moved to the shift positions "P", "R", "N" and "D" based on the reference value of the position voltage PV. Moreover, there is no need to provide the graph shown in FIG. 8. The pulse count number CP may be respectively set as a correlation depending on a kind of shifts which is the relationship between the current shift position and the shift operated position PSH.

Here, various issues will arise, as described below, on determining the shift positions "P", "R", "N" and "D" of the manual valve 46 depending on the position voltage PV output from the noncontact position sensor 74. That is, a the position voltage PV of the hall element 78 varies due to magnet disturbance caused by electric component parts installed on the vehicle, or variations in environmental temperature, or change with time or the like. Then, a deviation occurs in the correlation between the position voltage PV and each of the shift positions "P", "R", "N" and "D" shown in FIG. 7, thereby making the precise determination of the pertinent shift positions difficult. This controls the SBW actuator 64 based on for instance erroneous shift position information, driving the actual shift positions "P", "R", "N" and "D" of the manual valve 46 to positions different from the shift operated positions PSH intended by driver's shift-intention. Further, if the position voltage PV varies during a running of the vehicle, a deviation of the actual shift positions "P", "R", "N" and "D" of the manual valve 46 from normal positions is determined. Subsequently, the SBW actuator 64 is controlled such that the position voltages PV match reference values of for instance the shift positions "P", "R", "N" and "D", upon which the spool 47 of the manual valve 46 is corrected in position. If the shift control device has such a function, such a correction may deviate the spool 47 from the normal position in a reverse affect.

Figure 9:
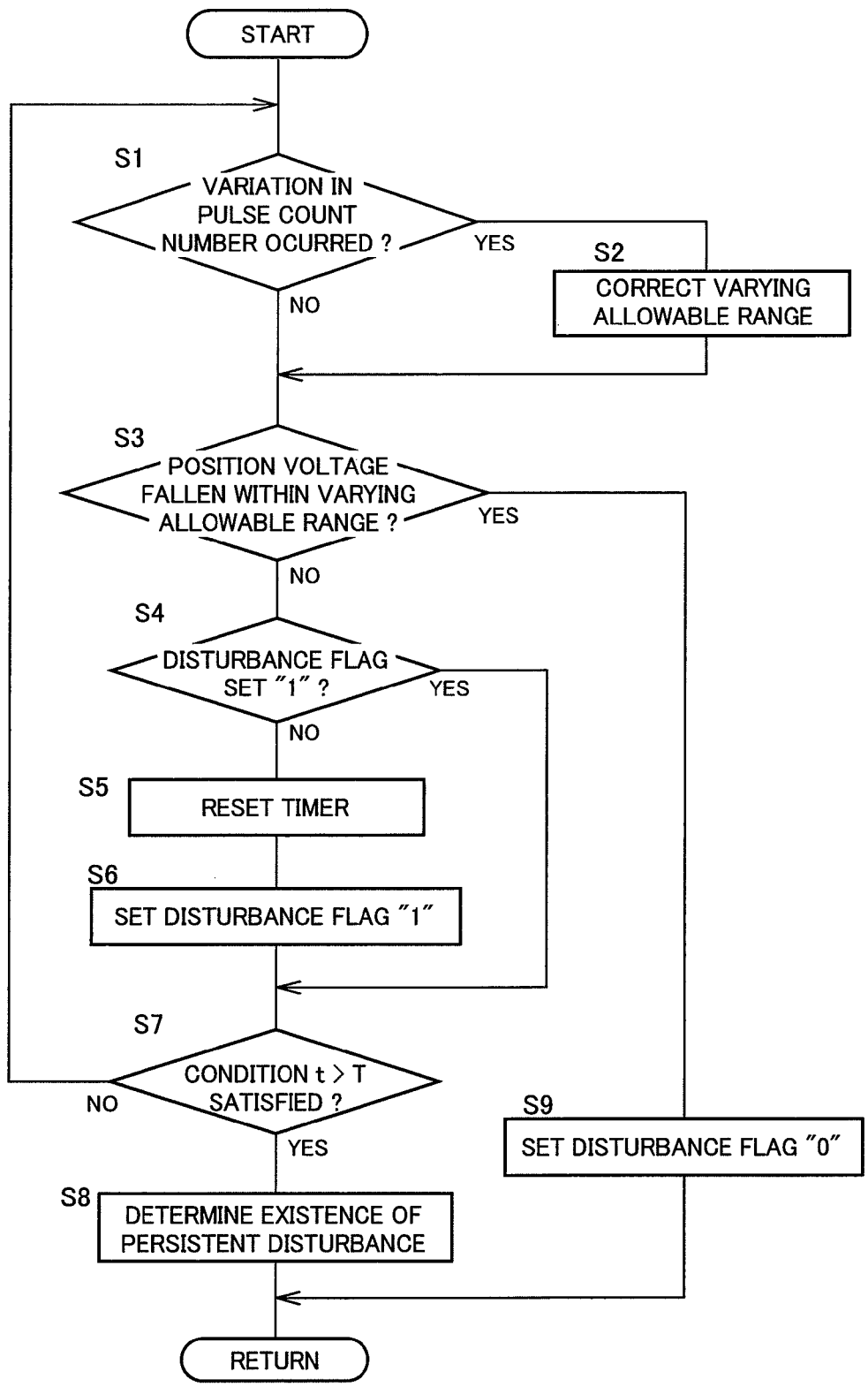
FIG. 9 is a flowchart concretely illustrating signal processing performed by disturbance determining means shown in FIG. 6.
Figure 10:
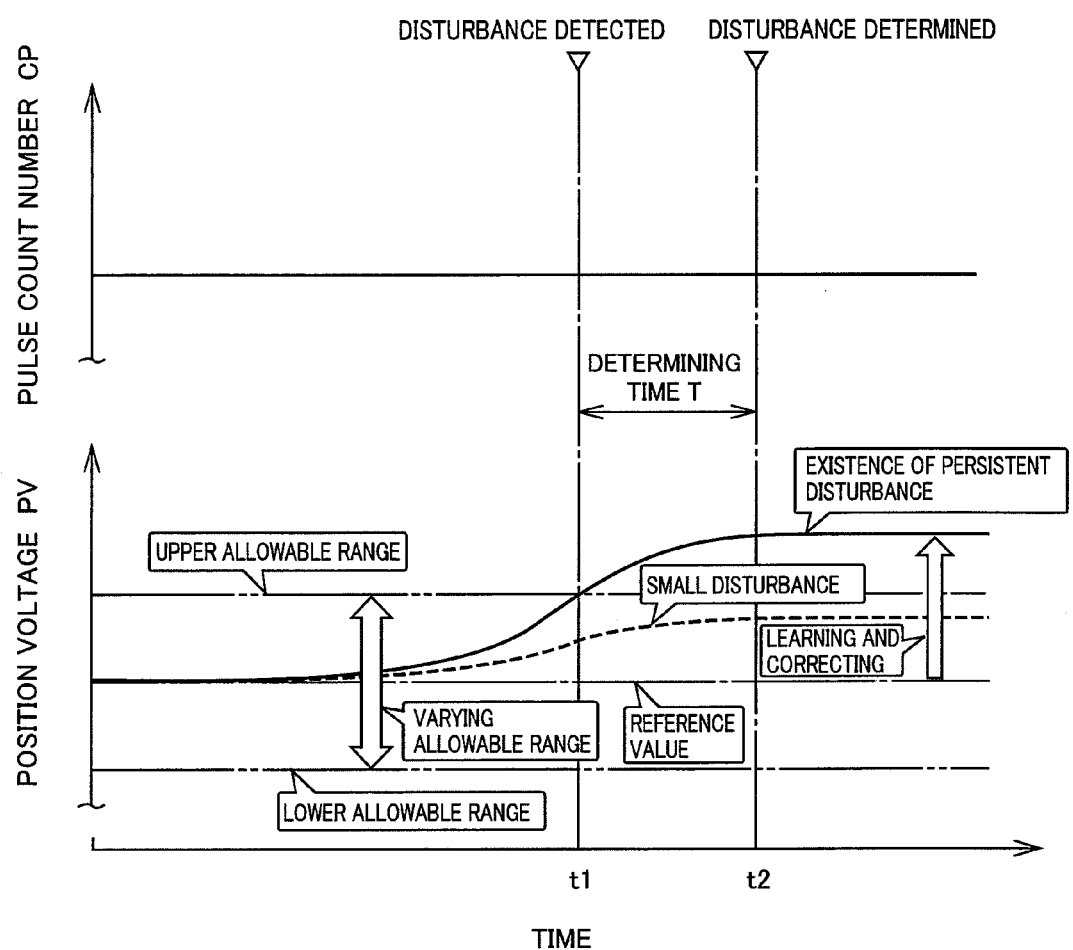
FIG. 10 is a timing chart illustrating one example as to how the pulse count number CP and the position voltage PV vary with a shift operated position being remained fixed, when shift control means shown in FIG. 6 controls the manual valve.
Figure 11:
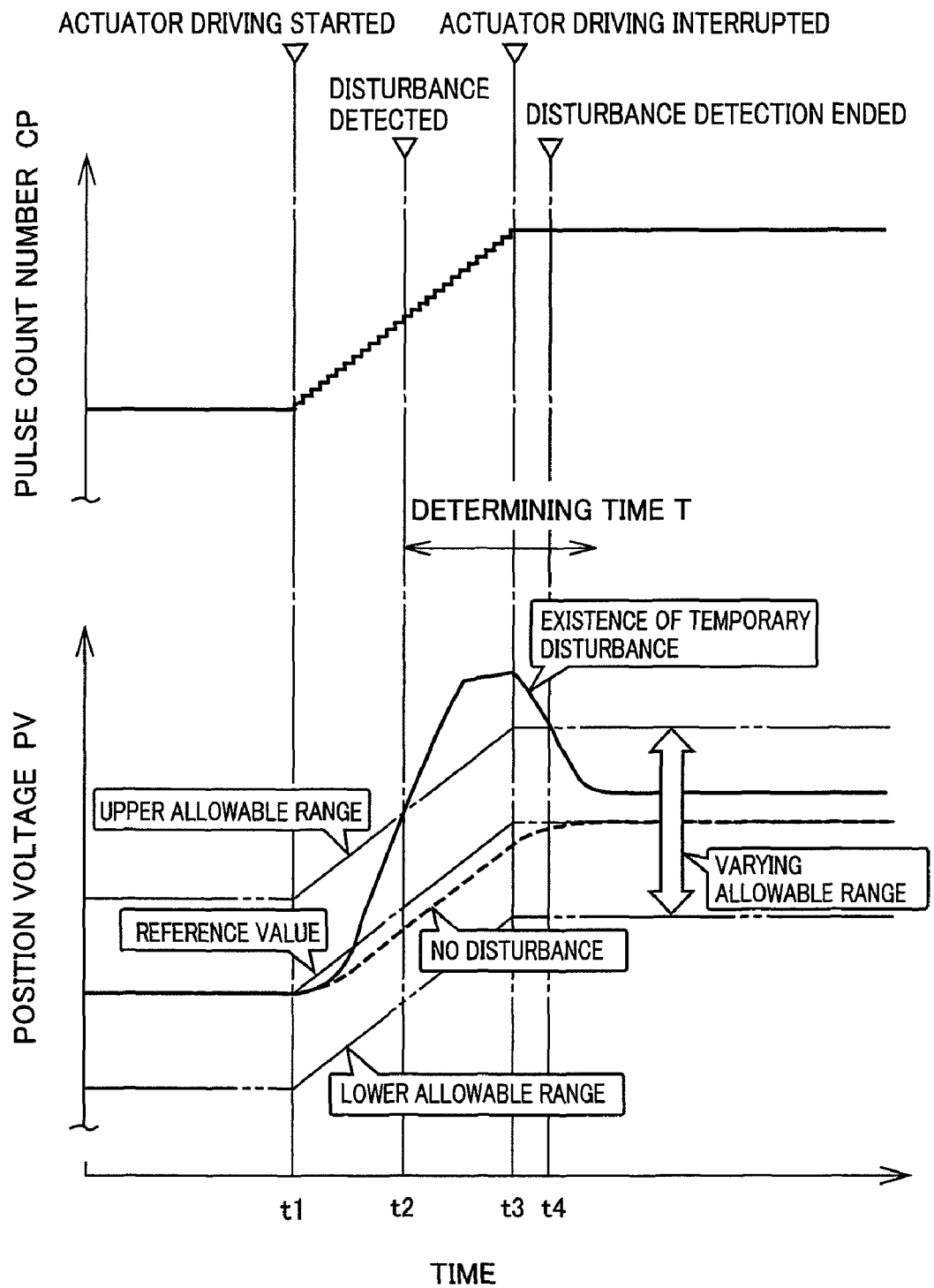
FIG. 11 is a timing chart illustrating one example as to how the pulse count number CP and the position voltage PV vary with the shift position being switched depending on a shift operation, when the shift control means shown in FIG. 6 controls the manual valve.

On the contrary, with the present embodiment, the shift control means 80 further includes disturbance determining means 90 and correcting means 92. This accurately determines the shift positions "P", "R", "N" and "D" of the manual valve 46 even under a variation in the position voltage PV of the hall element 78 caused by a variation in magnet disturbance, environmental temperature or deterioration with time or the like. FIG. 9 is a flowchart concretely illustrating a signal processing performed by the disturbance determining means 90, and FIGS. 10 and 11 represent timing charts showing examples of variations in the pulse count number CP and the position voltage PV during signal processing executed in accordance with the flowchart of FIG. 9. FIG. 10 represents a case wherein with the shift operated position PSH kept constant by the manual valve 46, the shift position of the manual valve 46 is remained fixed, and FIG. 11 represents another case wherein the shift position of the manual valve 46 is moved from for instance "N" to "D" in response to a shifting operation. The disturbance determining means 90, corresponding to error determining means, determines the variation occurring in the position voltage PV by the variation in magnetic fluxes, as the disturbance. It also determines the variations occurring in the position voltages PV resulting from a change with time in output characteristic of the hall element 78, and variation in environmental temperature.

Figure 12:
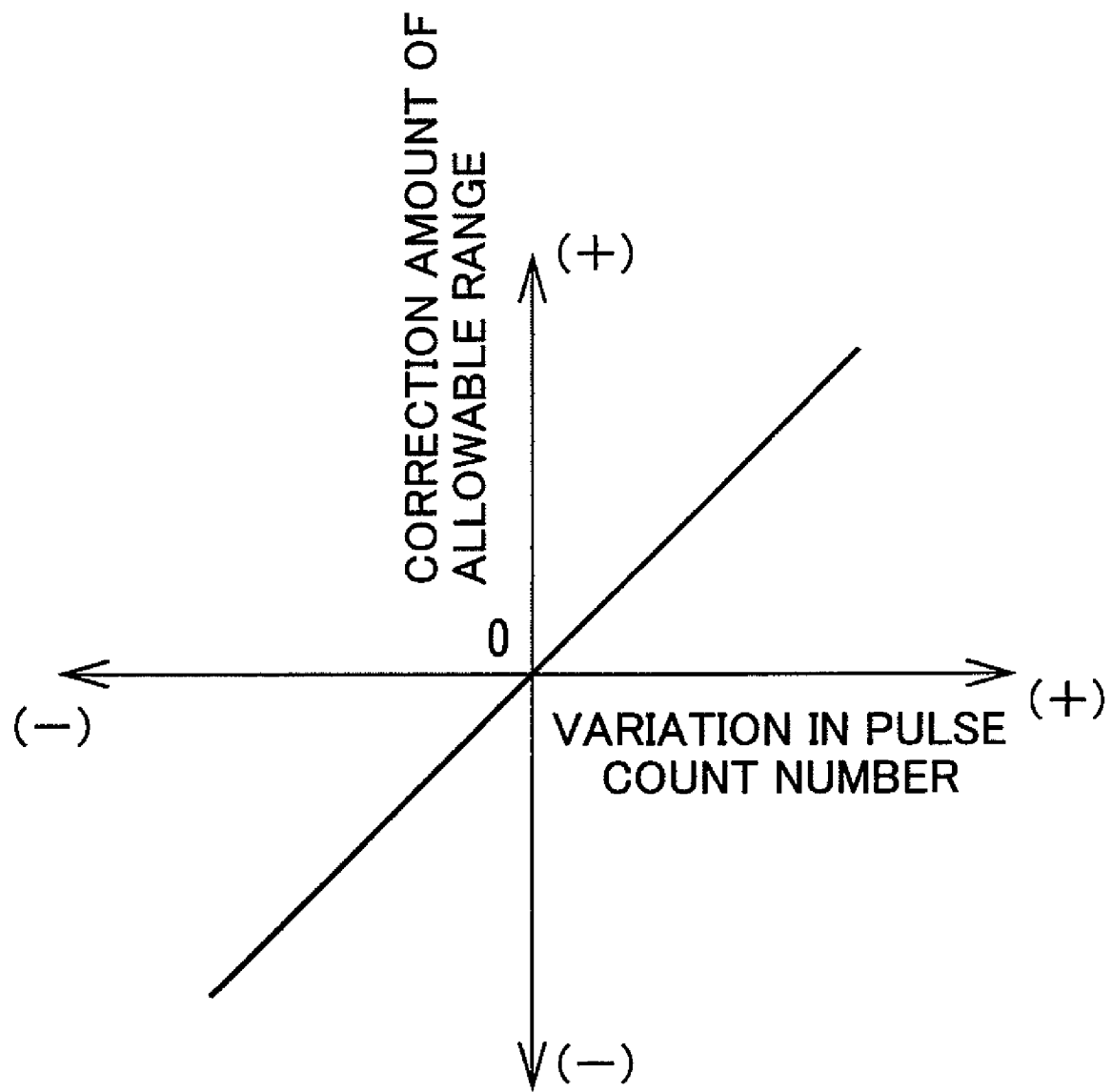
FIG. 12 is a view illustrating the amount of correction performed when step S2 shown in FIG. 9 is executed to correct a varying allowable range in accordance with a variation in pulse count number CP.

In FIG. 9, at step S1, as to whether a variation occurs in the pulse count number CP indicative of a count number of the pulse signal SP supplied from the rotary encoder 72 is determined. That is, the determination is made as to whether a displacement occurs in the rotation of the changeover shaft 66 about the center axis "O" resulted from the control of the shift mechanism 70 due to the shift operation of the shift operation device 50 by the operation of the drive control means 86. If no variation occurs in the pulse count number CP, then, operations subsequent to step S3 are succeedingly executed. In contrast, if the variation occurs in the pulse count number CP, then, step S2 is executed to correct the varying allowable range. The varying allowable range is defined by the lower allowable range and the upper allowable range, shown in FIG. 7, and the correction amount thereof is calculated in accordance with for instance a map and a calculation formula or the like that are preliminarily determined depending on the variation in the pulse count number CP as shown in FIG. 12. The map and calculation formula are determined based on an output characteristic of the position voltage PV shown in FIG. 7, and an output characteristic of the pulse signal SP of the rotary encoder 72 shown in FIG. 8, such that the same range as the allowable range shown in FIG. 7 is set depending on the rotational angle of the changeover shaft 66. In time period t1 to t3 in FIG. 11, the pulse count number CP continuously increases and the answer to step S1 is yes (positive), and subsequently the pulse count number CP continuously increases at step S2. The reference value is varied depending on the variation in the pulse count number CP. In addition, the varying allowable range may be altered in accordance with a reference value which varies depending on the variation in the pulse count number CP.

At step S3, as to whether the position voltage PV falls within the varying allowable range is determined. Graphs indicated on a column of the position voltage PV in FIGS. 10 and 11 by double-dot lines represent the varying allowable range, which are used to determine as to whether the position voltage PV indicated by a solid line and a broken line falls in the varying allowable range. If the position voltage PV falls in the varying allowable range, then, a disturbance flag F is set to "0" at step S9, followed by ending of the operation. In contrast, if the position voltage PV deviates from the varying allowable range, then, operations subsequent to step S4 are executed. That is, in step S3 a determination is made as to whether a varying width of absolute positional information (position voltage PV) is larger than a certain reference (varying allowable range) relative to a varying width of relative positional information (pulse count number CP). In the graphs representing the position voltages PV indicated by the solid lines in FIGS. 10 and 11, at time t1 in FIG. 10 and time t2 in FIG. 11 the position voltages PV deviate from the varying allowable range due to disturbance. Further, at time t4 in FIG. 11 the position voltage PV once deviated from the varying allowable range is restored to the varying allowable range again.

At step S4, as to whether the disturbance flag F is set "1", and step S7 is immediately executed in case of F=1, are determined. However, since the disturbance flag F is initially set in "0" at initial setting, on executing step S4 at first with determination of NO (negative) at step S3, step S5 is executed with F=0. At step S5, a timer "t" is reset to newly start timekeeping. At succeeding step S6, the disturbance flag F is set to "1". Thus, the operations subsequent to step S3 are continuously executed with the flag set in F=1. Step S7 is executed subsequent to step S4, and the timer "t" measures a duration time in which the position voltage PV deviates from the varying allowable range.

At step S7, as to whether the duration time measured by the timer "t" exceeds a certain preset determining time T is determined. As long as the condition t≦T is satisfied, the operations subsequent to step S1 are repeatedly executed. If condition t>T is satisfied, step S8 is executed to determine existence of the persistent disturbance. The determining time T is provided to discriminate or determine as to whether disturbance is temporary or persistent. A fixed value of the determining time T is preliminarily determined such that the variation in the position voltage PV caused for instance by a temporary variation in a magnetic field, occurring during a driving of a motor among electric component parts mounted on the vehicle, is regarded to be temporary disturbance and excluded.

In the graph of the position voltage PV indicated by the solid line in FIG. 10, a measured time by the timer "t" becomes longer than the determining time T at time t2, which is determined at step S8 as the persistent disturbance. The graph of the position voltage PV indicated by the broken line in FIG. 10 represents a case where the variation of the position voltage PV by the persistent disturbance including change with time is relatively small in which the determination of step S3 is not to be NO (negative) at once. The graph of the position voltage PV indicated by the solid line in FIG. 11 represents another case where the position voltage PV, once deviated from the varying allowable range (at time t2), restores to a level within the varying allowable range before the time reaches the determining time T, under which no determination is made for existence of the persistent disturbance. The graph of the position voltage PV indicated by the broken line in FIG. 11, represents still another case wherein with no disturbance being included the position voltage PV is deviated from the reference value due to a response delay in the detecting, the position voltage PV undergoes a transition substantially in line with the reference value.

Turning back to FIG. 6, the correcting means 92 learns and corrects the correlation shown in FIG. 7, i.e., the correlation between the position voltage PV and the four shift positions "P", "R", "N" and "D" of the manual valve 46, depending on the deviated amount between the actual position voltage PV and the reference value, when existence of the persistent disturbance is determined at step S8. For instance, if the actual position voltage PV is higher than the reference value, then, the reference value and the upper and lower varying allowable ranges shown in FIG. 7, are totally elevated by such a deviated amount. In contrast, if the actual position voltage PV is lower than the reference value, then, the reference value and the upper and lower varying allowable ranges shown in FIG. 7, are totally lowered by such a deviated amount. Further, under a situation where the hall element 78 has a varying output characteristic, i.e., gradient of the reference value of the position voltage PV shown in FIG. 7 varies, the learning and correction may be made for each of the shift positions "P", "R", "N" and "D".

With the vehicular shift control device of the present embodiment, the disturbance determining means 90 is provided for determining or discriminating whether the persistent disturbance is existed in the position voltage PV indicative of absolute positional information. If the disturbance determining means 90 determines the existence of persistent disturbance, then, the correcting means 92 learns and corrects the preset correlation shown in FIG. 7, i.e., the correlation between the position voltage PV and the four shift positions "P", "R", "N" and "D" of the manual valve 46. Therefore, under a circumstance where the persistent disturbance tends to exist due to for instance variations in the magnetic-field disturbance or the environmental temperature, a change with time in the detecting characteristic of the hall element 78, the correlation is corrected. This can determines the four shift positions "P", "R", "N" and "D" of the manual valve 46 depending on the position voltage PV with increased precision at all times.

Further, with the present embodiment, the mechanical displacement of the shift mechanism 70 and the variation in the position voltage PV representing the absolute positional information are compared. The mechanical displacement of the shift mechanism 70 is represented by the variation in the pulse count number CP of the pulse signal SP output from the rotary encoder 72 provided for detecting the relative positional information of the rotation displacement of the changeover shaft 66. This can determine existence of the persistent disturbance in the position voltage PV with increased precision.

Furthermore, under a circumstance where the varying width of absolute positional information (position voltage PV) relative to the varying width of relative positional information (pulse count number CP) is continuously larger than certain reference (varying allowable range) for a time period beyond the determining time T, existence of the persistent disturbance is determined. This can determine existence of the persistent disturbance with further increased precision.

While the present invention has been described above with reference to the embodiment shown in the drawings, it is intended that the invention described be considered only as illustrative of one embodiment and that the present invention may be implemented in various modifications and improvements based on knowledge of those skilled in the art.

The invention claimed is:

1. A shift control device including:
    shift-intention detecting means that electrically detects a driver's shift-intention;
    a shift mechanism to be mechanically displaced to a plurality of shift positions by shift drive means electrically controlled based on the driver's shift-intention;
    noncontact type first positional information detecting means that detects an absolute positional information of a mechanical displacement of the shift mechanism; and
    shift position determining means that determines the shift position in accordance with a correlation preliminarily determined in terms of the absolute positional information and the plurality of shift positions based on the absolute positional information; the shift control device comprising:
    error determining means that determines a persistent error existed in the absolute positional information; and
    correcting means that corrects either one of the correlation preliminarily determined in terms of the absolute positional information and the plurality of shift positions, and the absolute positional information, when existence of the persistent error in the absolute positional information is determined.

2. The shift control device according to claim 1, further comprising second positional information detecting means that detects a relative positional information of the mechanical displacement of the shift mechanism,
    wherein the error determining means compares a variation in the absolute positional information and a variation in the relative positional information for determination.

3. The shift control device according to claim 2, wherein the error determining means determines existence of the persistent error, when a state, under which a varying width of the absolute positional information relative to a varying width of the relative positional information is larger than a certain reference, continues beyond a certain time period.

4. The shift control device according to claim 2, wherein:
    both of the absolute positional information and the relative positional information are represented by rotary angles;
    the first positional information detecting means is a noncontact rotary angle sensor operative to detect a magnetic field varying depending on the rotary angle; and
    the second positional information detecting means is a rotary encoder operative to output pulses depending on the rotary angle.

5. A shift control device including:
    shift-intention detecting means that electrically detects a driver's shift-intention;
    a shift mechanism to be mechanically displaced to a plurality of shift positions by shift drive means electrically controlled based on the driver's shift-intention;
    noncontact type first positional information detecting means that detects an absolute positional information of a mechanical displacement of the shift mechanism; and
    shift position determining means that determines the shift position in accordance with a correlation preliminarily determined in terms of the absolute positional information and the plurality of shift positions based on the absolute positional information; the shift control device comprising:

second positional information detecting means that detects an absolute positional information or a relative positional information of the mechanical displacement of the shift mechanism by a principle different from a principle of the first positional information detecting means;

error determining means that determines a persistent error existed in the absolute positional information by comparing a variation in the absolute positional information detected by the first positional information detecting means and a variation in the positional information detected by the second positional information detecting means; and correcting means that corrects either one of the correlation preliminarily determined in terms of the absolute positional information and the plurality of shift positions, and the absolute positional information, when existence of the persistent error in the absolute positional information is determined.

* * * * *